(12) United States Patent
Jiang et al.

(10) Patent No.: US 11,342,655 B2
(45) Date of Patent: May 24, 2022

(54) LIQUID CRYSTAL DISPLAY PANEL AND ELECTRONIC DEVICE

(71) Applicant: Shenzhen China Star Optoelectronics Semiconductor Display Technology Co., Ltd., Shenzhen (CN)

(72) Inventors: Miao Jiang, Shenzhen (CN); Zhengyu Feng, Shenzhen (CN); Lixuan Chen, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 232 days.

(21) Appl. No.: 16/768,696

(22) PCT Filed: Dec. 24, 2019

(86) PCT No.: PCT/CN2019/127734
§ 371 (c)(1),
(2) Date: Jun. 1, 2020

(87) PCT Pub. No.: WO2021/114391
PCT Pub. Date: Jun. 17, 2021

(65) Prior Publication Data
US 2021/0408673 A1  Dec. 30, 2021

(30) Foreign Application Priority Data

Dec. 12, 2019  (CN) ........................ 201911273713.4

(51) Int. Cl.
*G02F 1/133* (2006.01)
*H01Q 1/36* (2006.01)
*G02F 1/1335* (2006.01)
*H01Q 1/22* (2006.01)

(52) U.S. Cl.
CPC ............... *H01Q 1/36* (2013.01); *G02F 1/133* (2013.01); *G02F 1/133514* (2013.01); *H01Q 1/22* (2013.01)

(58) Field of Classification Search
CPC ........................................ G02F 1/133
See application file for complete search history.

(56) References Cited

U.S. PATENT DOCUMENTS

2019/0179195 A1*  6/2019  Zhang ................. H01Q 1/2266
2020/0089042 A1   3/2020  Cao et al.

FOREIGN PATENT DOCUMENTS

| CN | 105589269 | 5/2016 |
|---|---|---|
| CN | 106684551 | 5/2017 |
| CN | 106842672 | 6/2017 |
| CN | 108321503 | 7/2018 |
| CN | 108390656 | 8/2018 |
| CN | 108563050 | 9/2018 |
| CN | 108693670 | 10/2018 |
| JP | 2000-138512 | 5/2005 |

* cited by examiner

Primary Examiner — Edmond C Lau

(57) ABSTRACT

An embodiment of the present application provides a liquid crystal display panel including: an array substrate; a color film substrate; a plurality of antenna modules, each of the antenna modules including a driving circuit unit, a plurality of radiation circuit units, and a ground electrode layer; and a liquid crystal molecular layer including a first liquid crystal molecular layer and a second liquid crystal molecular layer.

20 Claims, 2 Drawing Sheets

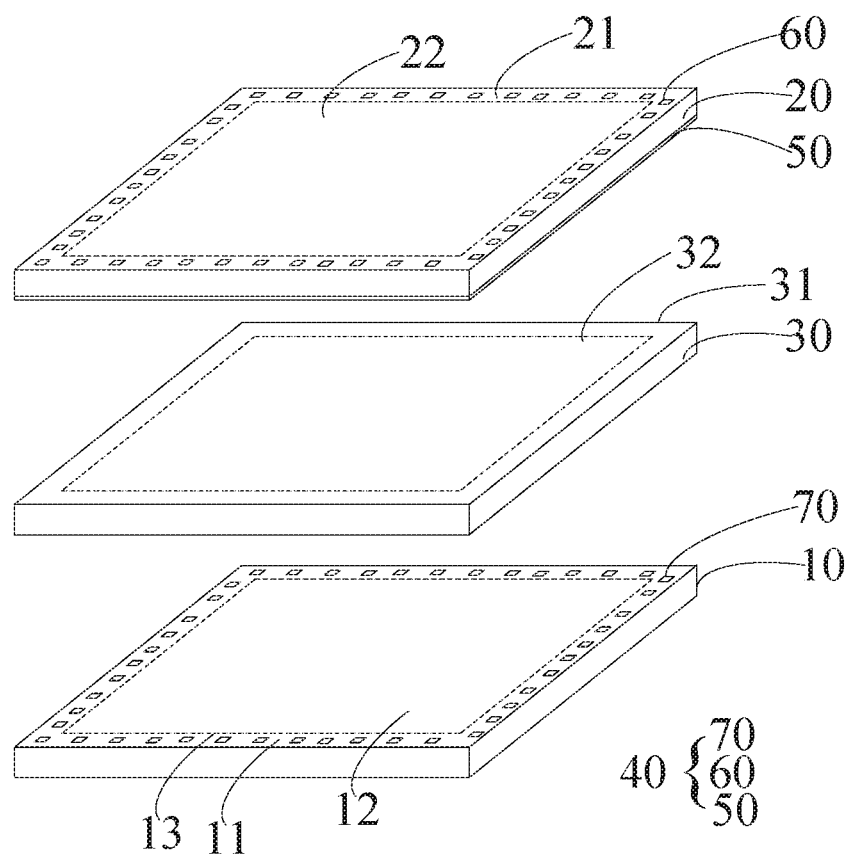
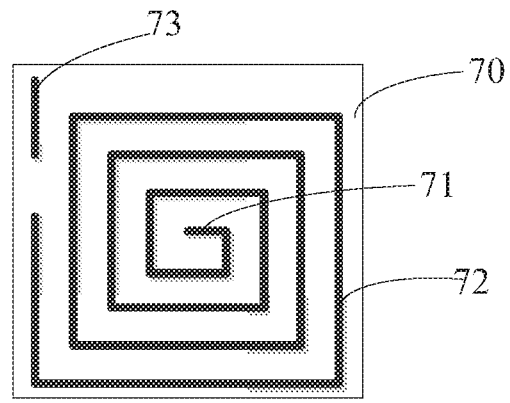

LIQUID CRYSTAL DISPLAY PANEL AND ELECTRONIC DEVICE

RELATED APPLICATIONS

This application is a National Phase of PCT Patent Application No. PCT/CN2019/127734 having International filing date of Dec. 24, 2019, which claims the benefit of priority of Chinese Patent Application No. 201911273713.4 filed on Dec. 12, 2019. The contents of the above applications are all incorporated by reference as if fully set forth herein in their entirety.

FIELD AND BACKGROUND OF THE INVENTION

The present application relates to a field of display, and in particular to a liquid crystal display panel and an electronic device.

A flat panel antenna based on liquid crystal is a new type of phased array antenna, which has received widespread attention due to its characteristics of transmitting and receiving signals directionally under regulation of an electric field. In a high-frequency band (15 GHz-1.5 THz), the liquid crystal antenna has obvious advantages over ordinary antennas. The exiting liquid crystal antenna is mainly used as a separate flat plate antenna unit for satellite communication, which is an important part of future autopilot.

However, in the prior art, since the liquid crystal antenna and a display portion of the liquid crystal display panel are integrated, the function is driven in a multiplexed manner, which will cause a signal of the antenna to be shielded and interfered by the panel itself. Therefore, there is an urgent need to improve defects of the existing technology.

SUMMARY OF THE INVENTION

An object of embodiments of the present application is to provide a liquid crystal display panel and an electronic device, which can prevent a signal of the antenna modules from being shielded by the display panel itself, thus improving the signal intensity of the antenna modules.

An embodiment of the present application provides a liquid crystal display panel, including:

an array substrate including a non-display area and a display area;

a color filter substrate disposed opposite to the array substrate, the color filter substrate including a first area directly opposite to the non-display area and a second area directly opposite to the display area;

a plurality of antenna modules, wherein each of the antenna modules includes a driving circuit unit, a plurality of radiation circuit units, and a ground electrode layer, wherein the driving circuit unit is disposed on an upper surface of the non-display area of the array substrate, the radiation circuit units are disposed on an upper surface of the first area of the color filter substrate, and the ground electrode layer is disposed on a lower surface of the first area of the color filter substrate; and a liquid crystal molecular layer, including a first liquid crystal molecular layer for frequency modulation of the antenna modules and a second liquid crystal molecular layer for display, wherein the first liquid crystal molecular layer is sandwiched between the first area and the non-display areas, and the second liquid crystal molecular layer is partially sandwiched between the second area and the display area, wherein the non-display area is arranged around the display area; the plurality of antenna modules are arranged at regular intervals along a circumferential direction of the non-display area.

In the liquid crystal display panel described in the embodiments of the present application, the plurality of antenna modules are arranged at regular intervals along a circumferential direction of the non-display area in at least two turns, and the antenna modules in adjacent ones of the at least two turns are staggered from each other.

In the liquid crystal display panel described in the embodiments of the present application, the radiation circuit units are coupled to the ground electrode layer.

In the liquid crystal display panel described in the embodiments of the present application, stability of the first liquid crystal molecular layer is greater than stability of the second liquid crystal molecular layer, and optical performance of the second liquid crystal molecular layer is stronger than optical performance of the first liquid crystal molecular layer.

In the liquid crystal display panel described in the embodiments of the present application, the upper surface of the first area of the array substrate is further provided with a signal input port and a feeding network, the signal input port is coupled to the feeding network, and the feeding network extends along a circumferential direction of the non-display area to electrically connect to each of the driving circuit units.

In the liquid crystal display panel described in the embodiments of the present application, each of the radiation circuit units is a circular patch or a square patch.

In the liquid crystal display panel described in the embodiments of the present application, the array substrate is further provided with an annular transparent metal trace thereon, and the transparent metal trace is disposed on a boundary line between the display area and the non-display area.

An embodiment of the present application provides a liquid crystal display panel, including:

an array substrate including a non-display area and a display area;

a color filter substrate disposed opposite to the array substrate, the color filter substrate including a first area directly opposite to the non-display area and a second area directly opposite to the display area;

a plurality of antenna modules, wherein each of the antenna modules includes a driving circuit unit, a plurality of radiation circuit units, and a ground electrode layer, wherein the driving circuit unit is disposed on an upper surface of the non-display area of the array substrate, the radiation circuit units are disposed on an upper surface of the first area of the color filter substrate, and the ground electrode layer is disposed on a lower surface of the first area of the color filter substrate; and a liquid crystal molecular layer, including a first liquid crystal molecular layer for frequency modulation of the antenna modules and a second liquid crystal molecular layer for display, wherein the first liquid crystal molecular layer is sandwiched between the first area and the non-display areas, and the second liquid crystal molecular layer is partially sandwiched between the second area and the display area.

In the liquid crystal display panel described in the embodiments of the present application, the non-display area is arranged around the display area.

In the liquid crystal display panel described in the embodiments of the present application, the plurality of antenna modules are arranged at regular intervals along a circumferential direction of the non-display area.

In the liquid crystal display panel described in the embodiments of the present application, the plurality of antenna modules are arranged at regular intervals along a circumferential direction of the non-display area in at least two turns, and the antenna modules in adjacent ones of the at least two turns are staggered from each other.

In the liquid crystal display panel described in the embodiments of the present application, the radiation circuit units are coupled to the ground electrode layer.

In the liquid crystal display panel described in the embodiments of the present application, stability of the first liquid crystal molecular layer is greater than stability of the second liquid crystal molecular layer, and optical performance of the second liquid crystal molecular layer is stronger than optical performance of the first liquid crystal molecular layer.

In the liquid crystal display panel described in the embodiments of the present application, the upper surface of the first area of the array substrate is further provided with a signal input port and a feeding network, the signal input port is coupled to the feeding network, and the feeding network extends along a circumferential direction of the non-display area to electrically connect to each of the driving circuit units.

In the liquid crystal display panel described in the embodiments of the present application, each of the radiation circuit units is a circular patch or a square patch.

In the liquid crystal display panel described in the embodiments of the present application, the array substrate is further provided with an annular transparent metal trace thereon, and the transparent metal trace is disposed on a boundary line between the display area and the non-display area.

An embodiment of the present application further provides an electronic device including a liquid crystal display panel, the liquid crystal display panel including:

an array substrate including a non-display area and a display area;

a color filter substrate disposed opposite to the array substrate, the color filter substrate including a first area directly opposite to the non-display area and a second area directly opposite to the display area;

a plurality of antenna modules, wherein each of the antenna modules includes a driving circuit unit, a plurality of radiation circuit units, and a ground electrode layer, wherein the driving circuit unit is disposed on an upper surface of the non-display area of the array substrate, the radiation circuit units are disposed on an upper surface of the first area of the color filter substrate, and the ground electrode layer is disposed on a lower surface of the first area of the color filter substrate; and a liquid crystal molecular layer, including a first liquid crystal molecular layer for frequency modulation of the antenna modules and a second liquid crystal molecular layer for display, wherein the first liquid crystal molecular layer is sandwiched between the first area and the non-display areas, and the second liquid crystal molecular layer is partially sandwiched between the second area and the display area.

In the electronic device described in this application, the non-display area is arranged around the display area.

In the electronic device described in this application, the plurality of antenna modules are arranged at regular intervals along a circumferential direction of the non-display area.

In the electronic device described in this application, the plurality of antenna modules are arranged at regular intervals along a circumferential direction of the non-display area in at least two turns, and the antenna modules in adjacent ones of the at least two turns are staggered from each other.

In view of above, the present invention provides a liquid crystal display panel including: an array substrate including a non-display area and a display area; a color filter substrate disposed opposite to the array substrate, the color filter substrate including a first area directly opposite to the non-display area and a second area directly opposite to the display area; a plurality of antenna modules, wherein each of the antenna modules includes a driving circuit unit, a plurality of radiation circuit units, and a ground electrode layer, wherein the driving circuit unit is disposed on an upper surface of the non-display area of the array substrate, the radiation circuit units are disposed on an upper surface of the first area of the color filter substrate, and the ground electrode layer is disposed on a lower surface of the first area of the color filter substrate; and a liquid crystal molecular layer, including a first liquid crystal molecular layer for frequency modulation of the antenna modules and a second liquid crystal molecular layer for display, wherein the first liquid crystal molecular layer is sandwiched between the first area and the non-display areas, and the second liquid crystal molecular layer is partially sandwiched between the second area and the display area. Accordingly, by arranging the antenna modules in the non-display area around the display area, a signal is prevented from being shielded by the display panel itself, thus improving the signal intensity of the antenna modules, and since two different liquid crystal molecular layers are employed for display and frequency modulation, performance of the antenna can be further improved.

BRIEF DESCRIPTION OF THE SEVERAL VIEWS OF THE DRAWINGS

In order to more clearly illustrate the embodiments or the technical solutions of the existing art, the drawings illustrating the embodiments or the existing art will be briefly described below. Obviously, the drawings in the following description merely illustrate some embodiments of the present invention. Other drawings may also be obtained by those skilled in the art according to these figures without paying creative work.

FIG. 1 is a layered exploded structural diagram of a liquid crystal display panel according to an embodiment of the present application.

FIG. 2 is a schematic structural diagram of driving circuit units of antenna modules of a liquid crystal display panel according to an embodiment of the present application.

DESCRIPTION OF SPECIFIC EMBODIMENTS OF THE INVENTION

Figure 3:
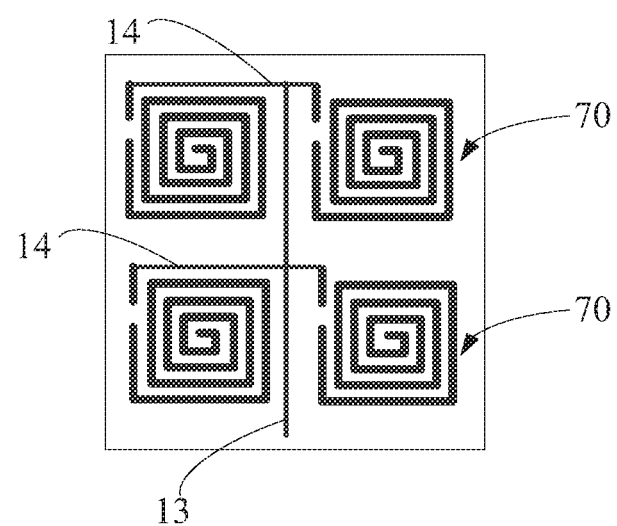
FIG. 3 is a schematic structural diagram of a connection relationship between a plurality of driving circuit units of antenna modules of a liquid crystal display panel according to an embodiment of the present application.

With reference to the appended drawings, exemplary embodiments of the present invention will be described in detail below. To aid in understanding the present invention, like numbers refer to like elements throughout the description of the figures, and the description of the same elements will be not reiterated. For illustration clarity, many details of practice are explained in the following descriptions. However, it should be understood that these details of practice do not intend to limit the present disclosure.

In the description of the present invention, it is to be understood that the terms "center", "longitudinal", "transverse", "length", "width", "thickness", "upper", "lower", "front", "post", "left", "right", "vertical", "horizontal", "top", "bottom", "inside", "outside", etc. demonstrating the orientation or positional relationship of the indications is based on the orientation shown in the drawings Or, the positional relationship is merely for the convenience of the description of the present invention and the simplification of the description, and is not intended to imply that the device or the component of the present invention has a specific orientation and is constructed and operated in a specific orientation, thus being not to be construed as limiting the present invention. Moreover, the terms "first" and "second" are used for descriptive purposes only and are not to be construed as indicating or implying a relative importance or not to implicitly indicate a number of technical features indicated. Thus, features defined by "first" or "second" may include one or more of the described features either explicitly or implicitly. In the description of the present invention, the meaning of "a plurality" is two or more unless specifically defined otherwise.

The following disclosure provides many different embodiments or examples for implementing different structures of the present invention. In order to simplify the disclosure of the present invention, the components and arrangements of the specific examples are described below. Of course, they are merely examples and are not intended to limit the present invention. In addition, the present invention may repeat reference numerals and/or reference letters in the various embodiments, which are for the purpose of simplicity and clarity, and do not indicate the relationship between the various embodiments and/or arrangements discussed. Moreover, the present invention provides examples of various specific processes and materials, but one of ordinary skill in the art will recognize the use of other processes and/or the use of other materials.

Please refer to FIG. 1, which is a layered exploded structural view of a liquid crystal display panel according to an embodiment of the present application. The liquid crystal display panel includes: an array substrate 10, a color film substrate 20, a plurality of antenna modules 40, and a liquid crystal molecular layer 30.

The array substrate 10 includes a non-display area 11 and a display area 12. The display area 12 is provided with a thin film transistor (TFT) array layer for driving display light. The non-display area 12 is provided with the plurality of antenna modules 40.

The color filter substrate 20 is disposed opposite to the array substrate 10. The color filter substrate 20 includes a first area 21 directly opposite to the non-display area 11 and a second area 22 directly opposite to the display area 12.

The plurality of antenna modules 40 are arranged at regular intervals along the non-display area 11. Each antenna modules 40 includes a driving circuit unit 70, a plurality of radiation circuit units 60, and a ground electrode layer 50. The driving circuit unit 70 is disposed on an upper surface of the non-display area 11 of the array substrate 10, the plurality of radiation circuit units 60 are disposed on an upper surface of the first area 21 of the color filter substrate 20, and the ground electrode layer 50 is disposed on a lower surface of the first area 21 of the color filter substrate 20. The liquid crystal molecular layer 30 includes a first liquid crystal molecular layer 31 for frequency modulation of the antenna modules 40 and a second liquid crystal molecular layer 32 for display, wherein the first liquid crystal molecular layer 31 is sandwiched between the first area 21 and the non-display areas 11, and the second liquid crystal molecular layer 32 is partially sandwiched between the second area 22 and the display area 12.

As shown in FIG. 2, in some embodiments, the driving circuit unit 70 includes an input port 73, a coupling point 71, and a phase shifter electrode line 72. The coupling point is connected to the phase shifter electrode line 72, and the input port is spaced apart from the phase shifter electrode line 72. However, it can be understood that the driving circuit unit 70 may also be other common driving circuit units for antennas, which are not listed herein one by one.

Specifically, in some embodiments, the non-display area 11 is disposed around the display area 12. The plurality of antenna modules 40 are arranged at regular intervals along the circumferential direction of the non-display area 11. The display area 12 has a rectangular shape, and the non-display area has a rectangular frame shape adapted to it.

In some embodiments, the plurality of antenna modules 40 are arranged at regular intervals along a circumferential direction of the non-display area 11 in at least two turns, and the antenna modules 20 in adjacent ones of the at least two turns are staggered from each other, so that interference between the antenna modules 40 and interference of the antenna modules on the circuits in the display area can be reduced.

In some embodiments, the first area 21 on the color filter substrate 20 is further provided with coupling grooves for coupling the ground electrode layer with the radiation circuit units.

In some embodiments, the first liquid crystal molecular layer 31 includes a high tunable range liquid crystal GT7-29001, and the second liquid crystal molecular layer 32 includes a K15 type liquid crystal or an E7 type liquid crystal. The first liquid crystal molecular layer 31 has better stability, while the second liquid crystal molecular layer 32 has better optical performance. The stability of the first liquid crystal molecular layer 31 is greater than the stability of the second liquid crystal molecular layer 32. The optical performance of the second liquid crystal molecular layer 32 is stronger than optical performance of the first liquid crystal molecular layer 31.

As shown in FIG. 3, in some embodiments, the upper surface of the first area 11 of the array substrate 10 is further provided with a signal input port 13 and a feeding network 14, and the signal input port 13 is coupled to the feeding network 14, and the feeding network 14 extends along a circumferential direction of the non-display area 11 to electrically connect to each of the driving circuit units 70.

In some embodiments, each of the radiation circuit units 60 is a circular patch or a square patch.

In some embodiments, the array substrate 10 is further provided with an annular transparent metal trace 12 thereon, and the transparent metal trace 12 is disposed on a boundary line between the display area 12 and the non-display area 11. The transparent metal trace 12 can reduce mutual interference between the antenna modules and the TFT array functional layer.

As can be seen from the above, In view of above, the present invention provides a liquid crystal display panel including: an array substrate including a non-display area and a display area; a color filter substrate disposed opposite to the array substrate, the color filter substrate including a first area directly opposite to the non-display area and a second area directly opposite to the display area; a plurality of antenna modules, wherein each of the antenna modules includes a driving circuit unit, a plurality of radiation circuit units, and a ground electrode layer, wherein the driving circuit unit is disposed on an upper surface of the non-display area of the array substrate, the radiation circuit units are disposed on an upper surface of the first area of the color filter substrate, and the ground electrode layer is disposed on a lower surface of the first area of the color filter substrate; and a liquid crystal molecular layer, including a first liquid crystal molecular layer for frequency modulation of the antenna modules and a second liquid crystal molecular layer for display, wherein the first liquid crystal molecular layer is sandwiched between the first area and the non-display areas, and the second liquid crystal molecular layer is partially sandwiched between the second area and the display area. Accordingly, by arranging the antenna modules in the non-display area around the display area, a signal is prevented from being shielded by the display panel itself, thus improving the signal intensity of the antenna modules, and since two different liquid crystal molecular layers are employed for display and frequency modulation, performance of the antenna can be further improved.

The present application also provides an electronic device adopting the liquid crystal display panel according to any of the above embodiments.

The liquid crystal display panel and the electronic device provided in the embodiments of the present application have been described in detail above. Specific examples are used in this document to explain the principles and implementation of the present invention. The descriptions of the above embodiments are only for understanding the method of the present invention and its core idea; Meanwhile, for those skilled in the art, according to the idea of the present invention, there will be changes in the specific implementation and application scope. In summary, the content of this specification should not be construed as a limitation on the present invention.

What is claimed is:

1. A liquid crystal display panel, comprising:
   an array substrate comprising a non-display area and a display area;
   a color filter substrate disposed opposite to the array substrate, the color filter substrate comprising a first area directly opposite to the non-display area and a second area directly opposite to the display area;
   a plurality of antenna modules, wherein each of the antenna modules comprises a driving circuit unit, a plurality of radiation circuit units, and a ground electrode layer, wherein the driving circuit unit is disposed on an upper surface of the non-display area of the array substrate, the radiation circuit units are disposed on an upper surface of the first area of the color filter substrate, and the ground electrode layer is disposed on a lower surface of the first area of the color filter substrate; and
   a liquid crystal molecular layer, comprising a first liquid crystal molecular layer for frequency modulation of the antenna modules and a second liquid crystal molecular layer for display, wherein the first liquid crystal molecular layer is sandwiched between the first area and the non-display areas, and the second liquid crystal molecular layer is partially sandwiched between the second area and the display area,
   wherein the non-display area is arranged around the display area; the plurality of antenna modules are arranged at regular intervals along a circumferential direction of the non-display area.

2. The liquid crystal display panel according to claim 1, wherein the plurality of antenna modules are arranged at regular intervals along the circumferential direction of the non-display area in at least two turns, and the antenna modules in adjacent ones of the at least two turns are staggered from each other.

3. The liquid crystal display panel according to claim 1, wherein the radiation circuit units are coupled to the ground electrode layer.

4. The liquid crystal display panel according to claim 1, wherein stability of the first liquid crystal molecular layer is greater than stability of the second liquid crystal molecular layer, and optical performance of the second liquid crystal molecular layer is stronger than optical performance of the first liquid crystal molecular layer.

5. The liquid crystal display panel according to claim 1, wherein the upper surface of the first area of the array substrate is further provided with a signal input port and a feeding network, the signal input port is coupled to the feeding network, and the feeding network extends along the circumferential direction of the non-display area to electrically connect each of the driving circuit units.

6. The liquid crystal display panel according to claim 1, wherein each of the radiation circuit units is a circular patch or a square patch.

7. The liquid crystal display panel according to claim 1, wherein the array substrate is further provided with an annular transparent metal trace thereon, and the transparent metal trace is disposed on a boundary line between the display area and the non-display area.

8. A liquid crystal display panel, comprising:
   an array substrate comprising a non-display area and a display area;
   a color filter substrate disposed opposite to the array substrate, the color filter substrate comprising a first area directly opposite to the non-display area and a second area directly opposite to the display area;
   a plurality of antenna modules, wherein each of the antenna modules comprises a driving circuit unit, a plurality of radiation circuit units, and a ground electrode layer, wherein the driving circuit unit is disposed on an upper surface of the non-display area of the array substrate, the radiation circuit units are disposed on an upper surface of the first area of the color filter substrate, and the ground electrode layer is disposed on a lower surface of the first area of the color filter substrate; and
   a liquid crystal molecular layer, comprising a first liquid crystal molecular layer for frequency modulation of the antenna modules and a second liquid crystal molecular layer for display, wherein the first liquid crystal molecular layer is sandwiched between the first area and the non-display areas, and the second liquid crystal molecular layer is partially sandwiched between the second area and the display area.

9. The liquid crystal display panel according to claim 8, wherein the non-display area is arranged around the display area.

10. The liquid crystal display panel according to claim 8, wherein the plurality of antenna modules are arranged at regular intervals along a circumferential direction of the non-display area.

11. The liquid crystal display panel according to claim 8, wherein the plurality of antenna modules are arranged at regular intervals along a circumferential direction of the non-display area in at least two turns, and the antenna modules in adjacent ones of the at least two turns are staggered from each other.

12. The liquid crystal display panel according to claim 8, wherein the radiation circuit units are coupled to the ground electrode layer.

13. The liquid crystal display panel according to claim 8, wherein stability of the first liquid crystal molecular layer is greater than stability of the second liquid crystal molecular layer, and optical performance of the second liquid crystal molecular layer is stronger than optical performance of the first liquid crystal molecular layer.

14. The liquid crystal display panel according to claim 8, wherein the upper surface of the first area of the array substrate is further provided with a signal input port and a feeding network, the signal input port is coupled to the feeding network, and the feeding network extends along a circumferential direction of the non-display area to electrically connect each of the driving circuit units.

15. The liquid crystal display panel according to claim 8, wherein each of the radiation circuit units is a circular patch or a square patch.

16. The liquid crystal display panel according to claim 8, wherein the array substrate is further provided with an annular transparent metal trace thereon, and the transparent metal trace is disposed on a boundary line between the display area and the non-display area.

17. An electronic device, comprising a liquid crystal display panel, the liquid crystal display panel comprising:
an array substrate comprising a non-display area and a display area;
a color filter substrate disposed opposite to the array substrate, the color filter substrate comprising a first area directly opposite to the non-display area and a second area directly opposite to the display area;
a plurality of antenna modules, wherein each of the antenna modules comprises a driving circuit unit, a plurality of radiation circuit units, and a ground electrode layer, wherein the driving circuit unit is disposed on an upper surface of the non-display area of the array substrate, the radiation circuit units are disposed on an upper surface of the first area of the color filter substrate, and the ground electrode layer is disposed on a lower surface of the first area of the color filter substrate; and
a liquid crystal molecular layer, comprising a first liquid crystal molecular layer for frequency modulation of the antenna modules and a second liquid crystal molecular layer for display, wherein the first liquid crystal molecular layer is sandwiched between the first area and the non-display areas, and the second liquid crystal molecular layer is partially sandwiched between the second area and the display area.

18. The electronic device according to claim 17, wherein the non-display area is arranged around the display area.

19. The electronic device according to claim 17, wherein the plurality of antenna modules are arranged at regular intervals along a circumferential direction of the non-display area.

20. The electronic device according to claim 17, wherein the plurality of antenna modules are arranged at regular intervals along a circumferential direction of the non-display area in at least two turns, and the antenna modules in adjacent ones of the at least two turns are staggered from each other.

* * * * *